United States Patent [19]

Hatin

[11] Patent Number: 5,188,494
[45] Date of Patent: Feb. 23, 1993

[54] TORQUE INDICATOR DEVICE AND METHOD FOR USE WITH A THREADED FASTENER

[75] Inventor: Donald T. Hatin, Ft. Wayne, Ind.

[73] Assignee: ITT Corporation, New York, N.Y.

[21] Appl. No.: 871,847

[22] Filed: Apr. 21, 1992

[51] Int. Cl.⁵ .............................................. F16B 31/02
[52] U.S. Cl. ...................................... 411/10; 411/13; 411/147; 411/157; 411/531
[58] Field of Search ................. 411/8, 9, 10, 11, 12, 411/13, 531, 371, 147, 151, 157, 136, 539, 14, 1, 6, 7

[56] References Cited

U.S. PATENT DOCUMENTS

| | | | |
|---|---|---|---|
| 1,229,623 | 6/1917 | Lambert | 411/10 X |
| 3,060,731 | 10/1962 | Adise | 411/425 X |
| 3,216,303 | 11/1965 | Melzer | 411/11 |
| 3,503,430 | 3/1970 | Tsurumoto | 411/147 |
| 4,000,681 | 1/1977 | Coldren | 411/12 |
| 4,047,463 | 9/1977 | Coldren | 411/12 |
| 4,958,970 | 9/1990 | Rose et al. | 411/12 |

FOREIGN PATENT DOCUMENTS 1183683 3/1970 United Kingdom ............... 411/13

*Primary Examiner*—Rodney M. Lindsey
*Attorney, Agent, or Firm*—Arthur L. Plevy; Patrick M. Hogan

[57] ABSTRACT

The present invention is a torque indicator device that provides a positive indication as to whether or not a threaded fastener has been tightened to a desired torque. The present invention torque indicator device is mounted under the head of a threaded fastener and is shaped so that the indicator device is displaced from beneath the threaded fastener's head as the threaded fastener is tightened to a predetermined torque. As the threaded fastener is tightened to a predetermined torque, the brightly colored indicator device falls away from the threaded fastener giving an easily observed positive indication as to whether the threaded fastener has been properly tightened.

14 Claims, 2 Drawing Sheets

TORQUE INDICATOR DEVICE AND METHOD FOR USE WITH A THREADED FASTENER

FIELD OF THE INVENTION

The present invention relates to a device and method for measuring the torque applied to a threaded fastener, and more particularly to such torque measuring devices and methods that position a brightly colored indicator below the head of a threaded fastener that breaks away from the threaded fastener as the threaded fastener is tightened to a predetermined torque.

BACKGROUND OF THE INVENTION

When observing a threaded fastener, such as a bolt, machine screw or the like, an observer cannot determine, by sight alone, the torque that has been applied to the threaded fastener. For example, an observed head of a bolt, that has only been hand tightened into a tapped hole, has the same appearance as a bolt that has been mechanically driven into the tapped hole at a high torque. During the manufacturing and assembly procedures of many devices, it is often the responsibility of an assembler to tighten certain threaded fasteners to a predetermined torque. However, due to human error, equipment failure or the like, it is not uncommon for an assembler, or even an automated machine, to fail to tighten all the threaded fasteners to their required torques. Additionally, since a loosely torqued threaded fastener has the same appearance as a properly torqued threaded fastener, it is very difficult to detect the undertorqued fastener during a quality control inspection. As such, undertorqued threaded fasteners may pass through the manufacturing procedure undetected, thereby compromising the engineered integrity of the device into which the undertorqued threaded fastener has been assembled.

In certain applications, the presence of a loose threaded fastener may result in the eventual failure of the entire device into which the threaded fastener was assembled. Additionally, in certain applications such as aircraft, spacecraft, high speed industrial machinery and the like, the failure mode caused by the loose threaded fastener may represent a danger to the lives of people. As such, in many fields of manufacture, the torque of certain critically positioned threaded fasteners must be checked in a separate operation, to assure for a proper assembly. The extra procedural step of testing the torque of threaded fasteners therein adds to both the cost and complexity of the manufacturing process.

In many other applications, the improper torque applied to a mechanical fastener does not represent a risk to the life of people or a risk to the overall performance of the device. However, an undertorqued threaded fastener may result in a loose part, the failure of a non-essential subcomponent or cause an undesired "rattle" in the assembly. Such defects in manufactured goods result in returned goods, warranty repairs and dissatisfied customers. The quality of manufactured goods is becoming increasingly more important to consumers in today's competitive markets. As such, manufacturers are now incurring increased manufacturing costs to ensure that even non-essential threaded fasteners are assembled at the proper torque, so as to assure quality and prevent customer dissatisfaction.

The present invention torque indicator is a device shaped in the general form of a split-ring washer that is placed around the shaft of the threaded fastener, below its head. The present invention is shaped so as to expand when the threaded fastener is tightened, breaking free of the threaded fastener at a predetermined torque. In the prior art there exist many different split-ring washers that are made to be used with threaded fasteners. Many prior art split-ring washers even have a shaped cross-sectional geometry that are designed to interact with the head of a threaded fastener. Such prior art split-ring washers are exemplified by U.S. Pat. Nos. 467,107 to Wiley, 646,226 to Kleman, 1,849,406 to Mc-Crudden and U.S. Pat. Nos. 1,876,834, 1,876,835 and 1,876,836 to Berge. However, in the art of split-ring washers, the expansion of the split ring washer, as the threaded fastener is tightened, is a highly undersirable characteristic. Consequently, the prior art split-ring washers are shaped to match the contour of the head of the threaded fastener or a set into shaped reliefs to deter the expansion of the washers when a torque is applied to threaded fasteners.

The present invention, although having the general appearance of a split-ring washer, is formed to have a function entirely different from that of a typical prior art split-ring washer. The objective of the present invention is to set forth a device that can be used in conjunction with a threaded fastener so as to give a positive, easily viewed indication as to whether a certain threaded fastener has been tightened to a proper torque value.

SUMMARY OF THE INVENTION

The present invention is a torque indicator device and corresponding method that provides a positive indication as to whether or not a threaded fastener has been tightened to a desired torque. The present invention includes a brightly colored indicator member having smooth surfaces with a low coefficient of friction and manufactured in the same general shape as a split-ring washer. The indicator member is annular having an outer peripheral edge and an inner aperture edge. The top and bottom surfaces of the indicator member are tapered so that the width of the indicator member increases as the outer peripheral edge is approached from the inner aperture edge. The indicator member is not continuous, but rather is disjoined along a severance line that extends from outer peripheral edge to the inner aperture edge. The shank of a threaded fastener is placed through the central aperture of the indicator member as the threaded fastener is fastened to a base component. As such, the indicator member is compressed between the head of the threaded fastener and the base component as the threaded fastener is tightened towards the base component.

The outer diameter of the indicator member is larger than the outer diameter of the head of the threaded fastener. As such, as the indicator member is compressed, the head of the threaded fastener contacts a point along the tapered top surface of the indicator member. As the threaded fastener is tightened the head of the threaded fastener rides along the smooth tapered top surface of the indicator member. The force of the head of the threaded fastener against the tapered surface of the indicator member deforms the indicator member outwardly, thereby increasing the size of the aperture within the indicator member. As the threaded fastener is tightened to a predetermined desired torque, the indicator member is forced apart such that its inner aperture exceeds the diameter for the head of the threaded fastener. At this point the indicator member is no longer held between the threaded aperture and the base component, whereby the indicator member can fall away from the threaded fastener.

By placing the present invention device around threaded fasteners during an assembly procedure there now exists a readily identifiable indicator for identifying whether a threaded fastener was assembled to a proper torque value. Since the present invention torque indicator only detaches from a threaded fastener after the threaded fastener was tightened to a desired torque, the presence of the present invention torque indicator on an assembly will alert an inspector as to the undertorqued fastener, thereby preventing any future harm or repairs caused by the loose fastener.

BRIEF DESCRIPTION OF THE DRAWINGS

For a better understanding of the present invention, reference is made to the following description of an exemplary embodiment thereof, considered in conjunction with the accompanying drawings, in which:

FIG. 3b is a top view of the embodiment shown in FIG. 3a;

FIG. 4b is a top view of the embodiment shown in FIG. 4a;

FIG. 5b is a top view of the embodiment shown in FIG. 5a; and

DETAILED DESCRIPTION OF THE INVENTION

Figure 1:
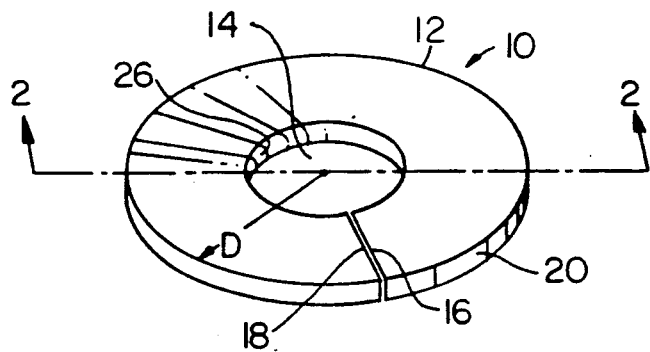
FIG. 1 is a perspective view of a preferred embodiment of the present invention torque indicator.
Figure 2:
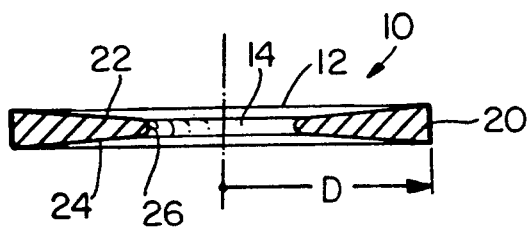
FIG. 2 is a cross-sectional view of the embodiment of the present invention torque indicator as shown in FIG. 1, viewed along section line 2—2.

In FIG. 1, an exemplary embodiment of the present invention torque indicator 10 is shown consisting of an annular member 12 that defines a center aperture 14. The annular member 12 is not continuous, but rather is shaped like a typical split-ring washer having a first end 16 and a second end 18 that abut against each other so as to give the annular member 12 its overall annular shape. The annular member 12 has a diameter D measured from the center of the central aperture 14 to an outer peripheral edge 20. Referring to FIG. 2, in conjunction with FIG. 1, it can be seen that the annular member 12 does not have a uniform thickness, but rather is tapered such that the thickness of the annular member 12 decreases as the central aperture 14 is approached from the peripheral edge 20. The taper across the annular member 12 causes the top surface 22 and the bottom surface 24 of the annular member 12 to have a predetermined angle of inclination. Although the slope of the top surface 22 and the bottom surface 24 may be different, the slope of both surfaces is preferably the same such that the annular member 12 is symmetrically formed and its geometry is unaffected by inversion. The inner aperture edge 26 of the annular member 12, facing the central aperture 14, is rounded, thereby preventing a sharp intersection point from occurring between the top and bottom surfaces 22, 24 along the aperture edge 26.

The present invention annular member 10 can be made of any hard smooth material that possesses a low coefficient of friction, such as polished metal or glazed ceramics, but is preferably made of a slick synthetic material such as glass-filled nylon, polytetrafluoroethylene, DELRIN or the like. The use of such synthetic material is preferred because it reduces the cost of manufacturing. Additionally, synthetic material is preferred because it is desirable to manufacture the present invention in bright, vibrant colors that are easily visibly recognizable. As such, the use of synthetic materials is preferred because they can be readily and inexpensively manufactured in a variety of distinguishing colors.

Figure 3A:
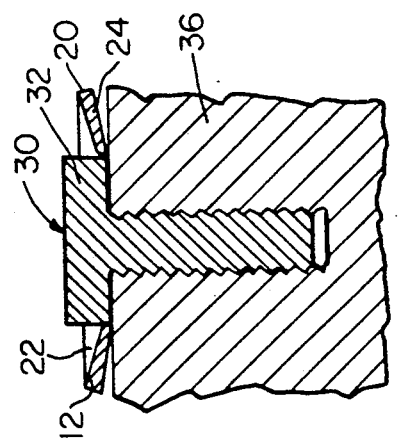
FIG. 3a is a fragmented cross-sectional view of the present invention torque indicator positioned below the head of a threaded fastener and resting against a base surface.

Referring now to FIG. 3a, it can be seen that, in operation, the present invention torque indicator 10 is placed under the head 32 of a threaded fastener 30, such that the threaded shank 34 of the fastener 30 passes through the central aperture 14 of the annular member 12. The threaded fastener 30 is then tightened into a base component 36, such that the present inventor torque indicator 10 is trapped between the threaded fastener head 32 and the upper surface of the base component 36. The base component 36 can be any object into which threaded fasteners usually pass. For example, if the threaded fastener 30 were a bolt the base component 36 could be a nut or tapped hole. Similarly, if the threaded fastener 30 were a screw, the base component 36 may be a piece of wood.

The chosen diameter D for the annular member 12 is dependent upon the size of the threaded fastener head 32. The diameter D of the annular member 12 is larger than that of the threaded fastener head 32, such that the threaded fastener head 32 contacts the sloped top surface 22 of the annular member 12 as the threaded fastener 30 is tightened into the base component 36. It should be recognized that if a washer (not shown) were placed between the annular member 12 and the head 32 of the threaded fastener 30, the diameter D of the annular member 12 would be chosen that is larger than the washer, such that the washer would contact the top surface 18 of the annular member 12 in the same manner as would the threaded fastener head 32, if no washer were present. The sloped top surface 22 and bottom surface 24 of the annular member 12 does not match either the configuration, the threaded fastener head 32 or the base component 36. As such, the annular member 12 is in contact with the threaded fastener head 32 at one distinct point along its sloped top surface 22. Similarly, the sloped bottom surface 24 of the annular member 12 only contacts the base component 36 at a distinct point proximate the peripheral edge 20.

Figure 3B:
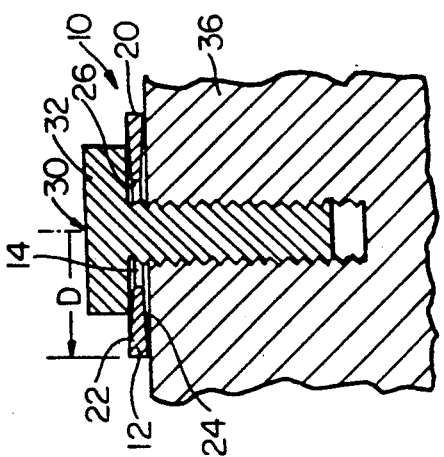

FIG. 3a shows the threaded fastener 30 tightened into the base component 36 to a point where the head 32 of the threaded fastener 30 just abuts against the annular member 12. Referring to FIG. 3b, in conjunction with FIG. 3a, it can be seen that the first end 16 and the second end 18 of the annular member 12 still are in abutment and the annular member 12 is not deformed from its annular shape, when little or no torque is applied to the threaded fastener 30.

Figure 4A:
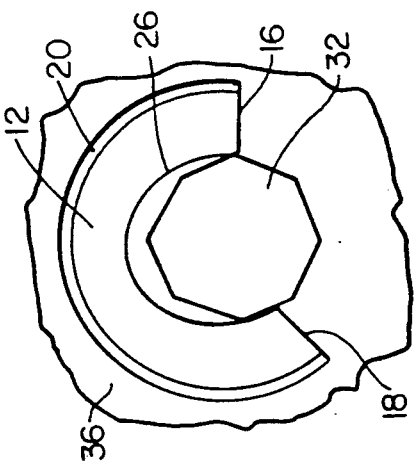
FIG. 4a is a fragmented cross-sectional view corresponding to FIG. 3a wherein a less than desired torque has been applied to the threaded fastener.
Figure 4B:
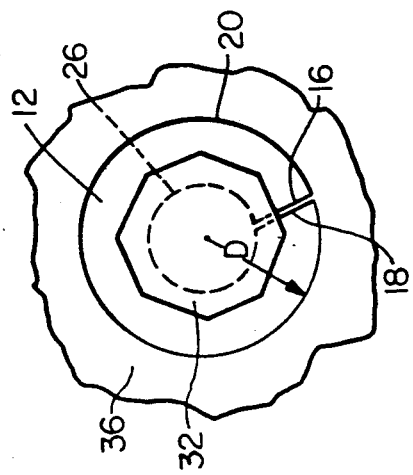

Referring to FIGS. 4a and 4b, the present invention torque indicator 10 is shown being partially compressed by a less than desired torque, in between the threaded fastener head 30 and the base component 36. The compression of the annular member 12 causes the bottom surface 24 of the annular member 12 to deform and lay flush against the below lying base component 36. As the bottom surface 24 of the annular member 12 is deformed against the tapped surface 36, a spring bias is formed within the annular member 12 that resists the deformation. Additionally, as the head 32 of the threaded fastener 30 is tightened against the smooth sloped top surface 22, the threaded fastener head 32 slides along the sloped top surface 22 causing the annular member 12 to expand outwardly away from its nominal shape. As the threaded fastener 30 is tightened, the sloped surfaces of the annular member 12 are squeezed between the advancing threaded fastener head 32 and the below lying base component 36. The resulting wedge action displaces the annular member 12 from below the threaded fastener head 32, thereby increasing the size of the center aperture 14. Referring to FIG. 4b, it can be seen that the annular member 12 is deformed from its nominal annular shape and the first end 16 and the second end 18 of the annular member are forced to spread away from one another as the area of the center aperture 14 increases.

Figure 5A:
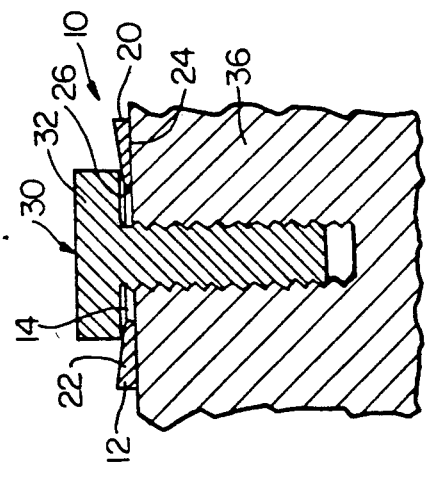
FIG. 5a is a fragmented cross-sectional view corresponding to FIGS. 3a and 4a wherein the threaded fastener has been tightened to a torque value just below a desired torque.
Figure 5B:
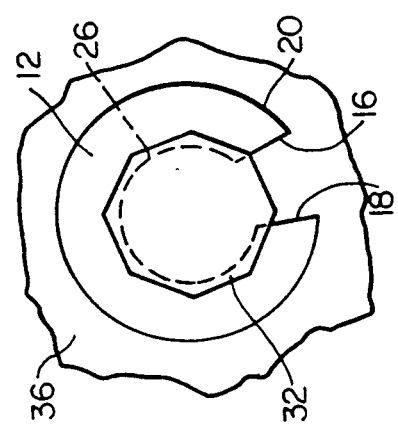

Referring to FIGS. 5a and 5b, the present invention torque indicator 10 is shown being compressed by a force just approaching a desired torque. As can be seen, the annular member 12 is almost entirely displaced from between the head 32 of the threaded fastener 30 and the below lying base component 36. The aperture edge 26 of the annular member 12 is rounded. As such, the aperture edge 26 is prevented from being pinched, or otherwise caught between the threaded fastener head 32 and the base component 36. As the annular member 12 is displaced from below threaded fastener head 32, the spring bias, created by the deformation of the bottom surface 24 of the annular member 12 against the below lying base component 36, causes the peripheral edge 20 of the annular member 12 to raise away from the base component 36. The rounded contour of the aperture edge 26, and the angle of the engagement between the aperture edge 26 and the threaded fastener head 32, caused by the elevated peripheral edge 20, combine to ensure that the annular member 12 occupies very little space between the threaded fastener 30 and the below lying base component 36 as a desired torque is reached. Consequently, when the annular member 12 is completely displaced, there is no significant reduction in the measure torque of the threaded fastener 30 caused by the absence of the annular member 12 from below the head 32 of the threaded fastener 30.

As the threaded fastener 30 is tightened to a desired torque, the annular member 12 is displaced from below the threaded fastener head 32. As a result of the displacement, the first end 16 and the second end 18 of the annular member 12 are driven apart so that the central aperture 14 of the annular member 12 can now encompass the entire head 30 of the threaded fastener 30. Looking at FIG. 5b, it can be seen that as the annular member 12 is displaced from below the threaded fastener 30, the first end 16 and the second end 18 are driven apart to a point where the annular member 12 is now substantially C-shaped. The diameter D of the annular member 12 is chosen for a given thread fastener head size such that when the annular member 12 is fully displaced, the first end 16 and the second end 18 of the annular member 12 separate past a critical point wherein the annular member 12 falls away from the threaded fastener 30. The manner by which the annular member 12 falls away from the threaded fastener 30 is dependent upon the material from which the annular member 12 is manufactured. For example, if the annular member 12 were made of spring steel or another material with a high spring constant, a spring bias will be formed in the annular member 12 as it is deformed into a C-shaped orientation. In such a construction, a diameter D would be chosen for the annular member 12 such that when the annular member 12 is displaced from below the threaded fastener head 32, the created spring bias acts to help the annular member 12 detach from the threaded fastener 30. Similarly, if the annular member 12 is formed of ceramic or plastic, a construction for the annular member 12 can be chosen such that the annular member 12 fractures, or non-elastically yields, just as it is displaced from under the threaded fastener head 32. The fractured or deformed annular member 12 can then fall away from the threaded fastener 30.

As has been previously mentioned in the preferred embodiment of the present invention torque indicator 10, the annular member 12 is formed from a brightly colored material. By placing the present invention around threaded fasteners during an assembly procedure there now exists a readily identifiable indicator as to whether the threaded fasteners were tightened to a proper torque. Since the present invention torque indicator 10 only detaches from a threaded fastener after the threaded fastener was tightened to a desired torque, the presence of the present invention torque indicator would easily alert an inspector as to an undertorqued condition.

Figure 6:
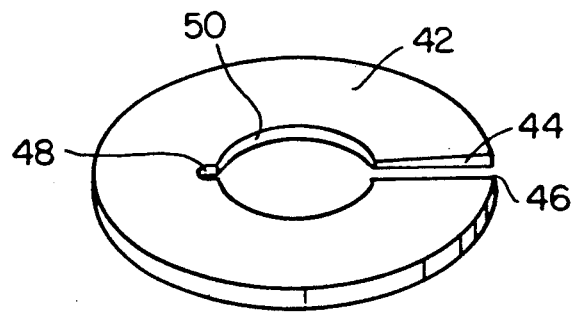
FIG. 6 is a perspective view of an alternative embodiment of the present invention torque indicator.

Referring now to FIG. 6, an alternate preferred embodiment of the present invention torque indicator 40 is shown, in where the annular member 42 is offset and progresses along a helical path. As such, the first end 44 and the second end 46 of the annular member 42 do not abut against each other, but rather the first end 44 terminates above the second end 46. In addition to the helical progression of the annular member 42, the shown embodiment of the torque indicator 40 also includes at least one stress relief 48. The stress relief 48 is positioned along the aperture edge 50 of the annular member 42, opposite the point at which the first end 44 and the second end 46 of the annular member 42 terminate. The stress relief 48 reduces the effective width of the annular member 42. As such, it will be recognized by a person skilled in the art that annular member 42 can now be more readily deformed into a C-shape by separating the first and second ends 44, 46. Additionally, by varying the size and shape of the stress relief 48, annular members 42 that yield at very precise torque values can be readily constructed.

The helical progression of the annular member 42 and the presence of the stress relief 48 both act to help the annular member 42 detach from a threaded fastener when the threaded fastener is tightened to a predetermined torque. As has been previously mentioned, the stress relief 48 helps the annular member deform into a C-shape as it is displaced from below a threaded fastener. Additionally, the helical progression of the annular member 42 helps a displaced annular member 42 detach from the head of a threaded fastener by helping to bias the first end 44 of the annular member 42 above the threaded fastener head, thereby freeing the annular member 42.

As should be understood in view of the above disclosures, the size and shape of the present invention torque indicator is dependent upon the size and shape of the threaded fastener on which it is used. More specifically, it is important to dimension the present invention torque indicator so that it is larger than the head of the threaded fastener, has a spring constant that allows it to be displaced from under the threaded fastener at a predetermined torque, and detaches from the threaded fastener once fully displaced. The specific dimensions that allow for these characteristics are dependent on the size of the threaded fastener and the material chosen from which the annular member is formed for a given application.

It should be understood that the embodiments of the present invention specifically described in conjunction with the figures were merely exemplary and that a person skilled in the art may make variations and modifications to the shown embodiments without departing from the spirit and scope of the invention. It should also be understood that the present invention indicator device can be placed under a nut being torqued onto a fixed threaded shank, and the use of a bolt in the description was merely exemplary. All such variations and modifications are intended to be included within the scope of the invention as defined in the appended claims.

What is claimed is:

1. A device for indicating whether a desired torque has been applied between a threaded fastener and a corresponding component, in which said threaded fastener is threadably engaged, comprising:

an indicator member positionable between said threaded fastener and said corresponding component, said indicator member having a displacement means formed thereon for completely displacing said indicator member from between said threaded fastener and said corresponding component as said desired torque is applied, without adversely reducing said desired torque between said threaded fastener and said corresponding component.

2. The device according to claim 1 wherein said threaded fastener includes a threaded shank and wherein said indicator member has an aperture formed therethrough through which said threaded shank can pass.

3. The device according to claim 2 wherein said indicator member is substantially annular in shape having an outer peripheral edge and an inner aperture edge, said indicator member being disjoined by a severance between said outer peripheral edge and said inner aperture edge thereby forming an opposing first end and second end in said indicator member wherein each said end adjoins said severance.

4. The device according to claim 3 wherein said displacement means includes a top surface, leading from said outer peripheral edge to said inner aperture edge, said top surface sloped whereby when said indicator member is compressed between said threaded fastener and said base component, said threaded fastener contacts the slope of said top surface, driving said indicator member out from between said threaded fastener and said corresponding component.

5. The device according to claim 4, wherein said displacement means includes a sloped bottom surface leading from said outer peripheral edge to said inner aperture edge, said bottom surface being deforced against said corresponding component as said indicator member is compressed between said threaded fastener and said corresponding component, the deformation of said bottom surface creating a spring bias in said indicator member that biases said outer peripheral edge from said corresponding component, said spring bias causing said outer peripheral edge to elevate thereby causing said inner aperture edge to rotate out from between said threaded fastener and said corresponding component as said desired torque is approached.

6. The device according to claim 5 wherein said bottom surface and said top surface have the same slope such that the shape and geometry of said indicator member is unaffected by the inversion of said indicator member.

7. The device according to claim 4, wherein said inner aperture edge is rounded to promote the displacement of said indicator member from between said threaded fastener and said corresponding component by reducing the space occupied by said inner aperture edge between said threaded fastener and said corresponding component as said desired torque is approached.

8. The device according to claim 4 wherein the contact of said threaded fastener against said top surface deforms said indicator member, driving said first end and second end of said indicator member apart, thereby increasing the size of said aperture.

9. The device according to claim 8 wherein said aperture is deformed to a size at least as large as the area of said threaded fastener contacting said indicator member, as said desired torque is applied.

10. The device according to claim 9 wherein said indicator member detaches from both said threaded fastener and said corresponding component as said desired torque is applied to said threaded fastener.

11. The device according to claim 10 wherein a spring bias is formed within said indicator member as said indicator member is deformed by said threaded fastener, said spring bias causing said indicator member to detach from said threaded fastener and said base component as said desired torque is applied to said threaded fastener.

12. The device according to claim 3 wherein said indicator member is brightly colored.

13. The device according to claim 3 wherein at least one stress relief is formed along said inner aperture edge of said indicator member, wherein said stress relief reduces the distance between said outer peripheral edge and said inner aperture edge.

14. The device according to Claim 13 wherein said indicator member follows a helical progression whereby said first end terminates above said second end.

* * * * *